United States Patent [19]
Chaya

[11] Patent Number: 5,268,784
[45] Date of Patent: Dec. 7, 1993

[54] PIVOTABLE MIRROR DEVICE FOR TRACKING

[75] Inventor: Masahiko Chaya, Yokohama, Japan

[73] Assignee: Canon Kabushiki Kaisha, Tokyo, Japan

[21] Appl. No.: 62,155

[22] Filed: May 17, 1993

Related U.S. Application Data

[63] Continuation of Ser. No. 828,147, Jan. 30, 1992, abandoned.

Foreign Application Priority Data

Feb. 5, 1991 [JP] Japan .................... 3-036795

[51] Int. Cl.⁵ .............................................. G02B 26/08
[52] U.S. Cl. .................................... 359/214; 359/221; 359/224; 369/44.16
[58] Field of Search ............... 359/213, 214, 221, 223, 359/224, 225, 226; 250/347, 348; 369/44.15, 44.16

[56] References Cited

U.S. PATENT DOCUMENTS

| | | | |
|---|---|---|---|
| 3,532,408 | 10/1970 | Dostal | 359/214 |
| 3,799,644 | 3/1974 | Street | 359/221 |
| 4,063,287 | 12/1977 | van Rosmalen | 369/44.15 |
| 4,421,381 | 12/1983 | Ueda et al. | 359/214 |
| 4,436,364 | 3/1984 | Lauer et al. | 359/214 |
| 4,878,721 | 11/1989 | Paulsen | 359/214 |
| 4,882,723 | 11/1989 | Van Rosmalen | 369/44.16 |
| 4,919,500 | 4/1990 | Paulsen | 359/224 |

*Primary Examiner*—Loha Ben
*Attorney, Agent, or Firm*—Fitzpatrick, Cella, Harper & Scinto

[57] ABSTRACT

A pivotable mirror device for tracking and for driving a light beam spot in the radial direction of an optical disk includes a mirror holder holding a reflecting mirror pivotably supported by a thin leaf spring. A planar portion of the thin leaf spring is laid on the reflecting surface of the reflecting mirror. The thin leaf spring is constricted between the planar portion and a portion in which the thin leaf spring is attached to a thin leaf spring supporting member to thereby form a torsional portion for pivotal movement thereof. A high attenuation member is attached to the torsional portion.

8 Claims, 3 Drawing Sheets

PIVOTABLE MIRROR DEVICE FOR TRACKING

This application is a continuation of application Ser. No. 07/828,147, filed Jan. 20, 1992, now abandoned.

BACKGROUND OF THE INVENTION

1. Field of the Invention

This invention relates to a pivotable mirror device for tracking used, for example, in an optical disk apparatus to cause a light beam spot to follow tracks on an optical disk.

2. Related Background Art

FIG. 1 of the accompanying drawings is a perspective view of an optical disk apparatus according to the prior art. In FIG. 1, the reference numeral 200 designates a base, the reference numeral 201 denotes a carriage supported on the base 200 for movement in the radial direction of an optical disk, not shown, the reference numeral 202 designates an objective lens supported on the carriage 201 by a leaf spring 204 and pivotable in the focusing direction of the optical disk, not shown, by an objective lens driving device 203, the reference numeral 205 denotes a pivotable mirror device for tracking which displaces a light beam emitted from a light source in the tracking direction of the optical disk, not shown, the reference numeral 206 designates a fixed optical system including a light source, a detector, PBS, etc., and the reference numeral 207 denotes a spindle motor on which the optical disk, not shown, is placed.

In the above-described construction, during the actual recording or reproduction of information, a light beam emitted from the light source is applied to the optical disk being rotated by a predetermined number of rotations by the spindle motor 207 while being tracking-controlled and focusing-controlled by the use of the pivotable mirror device for tracking and a focusing drive device, whereby the recording or reproduction of the information is effected.

FIG. 2 of the accompanying drawings is a perspective view showing the details of the pivotable mirror device 205 for tracking in FIG. 1.

Referring to FIG. 2, a mirror 1 is pivotably supported by a thin leaf spring 3 through a mirror holding member 2, and is designed to be pivotablly driven up and down by a yoke 4, a permanent magnet, not shown, and a coil attached to the rear of the mirror holding member 2. In FIG. 2, the constricted portion of the thin leaf spring 3 functions as a torsional portion, but a similar function may be performed by a wire material.

In the above-described example of the prior art, however, there is very little attenuation element for torsional vibration and therefore, the attenuation ratio (C/Cc) at the resonance frequency is small and as in the portion indicated by broken line in FIG. 3 of the accompanying drawings, the resonance amplitude becomes great. Therefore, a filter circuit of high order such as a notch filter is required in the control circuit of the pivotable mirror device for tracking, and this leads to the problems that the control circuit becomes complicated and that an apparatus carrying such device thereon requires a vibration control mechanism of extremely low resonance frequency and it is difficult to make the apparatus compact.

SUMMARY OF THE INVENTION

It is the object of the present invention to eliminate the above-noted problems and to provide a pivotable mirror device for tracking which is easy to control and which can be made compact.

The pivotable mirror device for tracking according to the present invention for achieving the above object is a pivotable mirror device for tracking for driving a light beam spot in the radial direction of an optical disk which is an information recording medium, characterized in that a mirror holding member holding a reflecting mirror is pivotably supported by a thin leaf spring, the planar portion of the thin leaf spring being laid on the reflecting surface of the reflecting mirror, the thin leaf spring is constricted between the planar portion and a portion in which the thin leaf spring is attached to a thin leaf spring supporting member to thereby form a torsional portion for the pivotal movement, and a high attenuation member is attached to the torsional portion.

DETAILED DESCRIPTION OF THE PREFERRED EMBODIMENTS

The present invention will hereinafter be described in detail with respect to an embodiment thereof shown in FIGS. 4 to 9.

Figure 1:
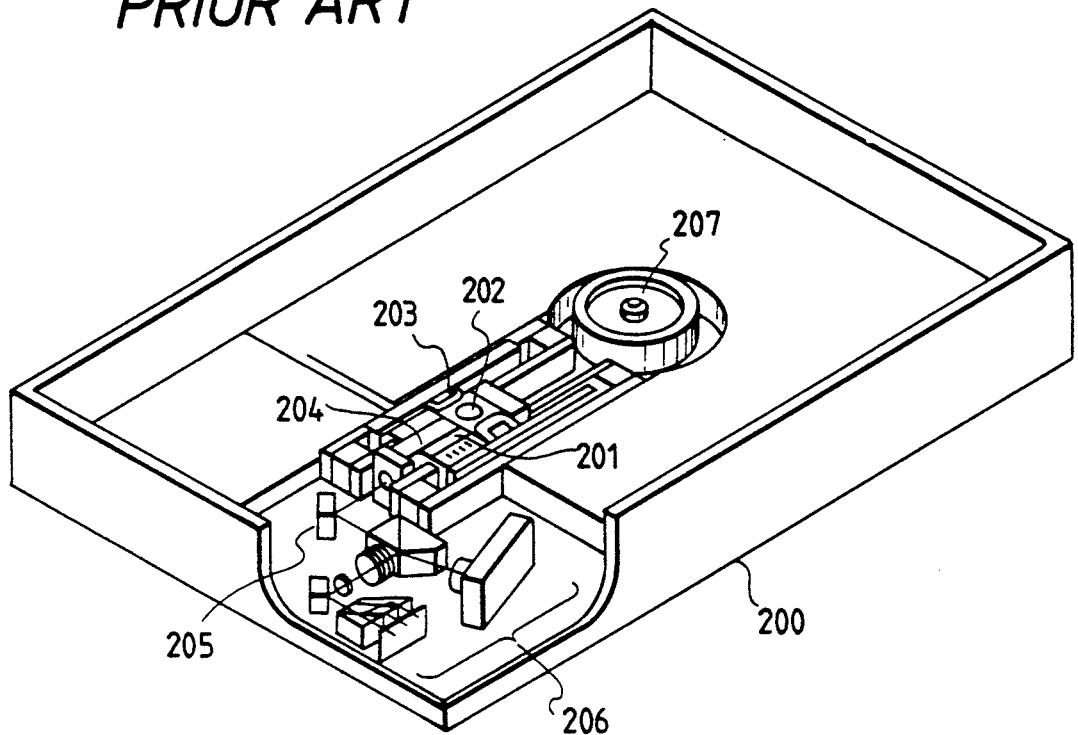
FIG. 1 is a perspective view of an optical disk apparatus according to the prior art.
Figure 2:
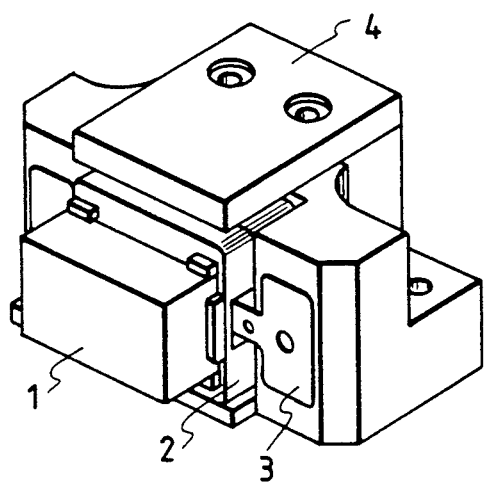
FIG. 2 is a detailed perspective view of a pivotable mirror device for tracking shown in FIG. 1.
Figure 4:
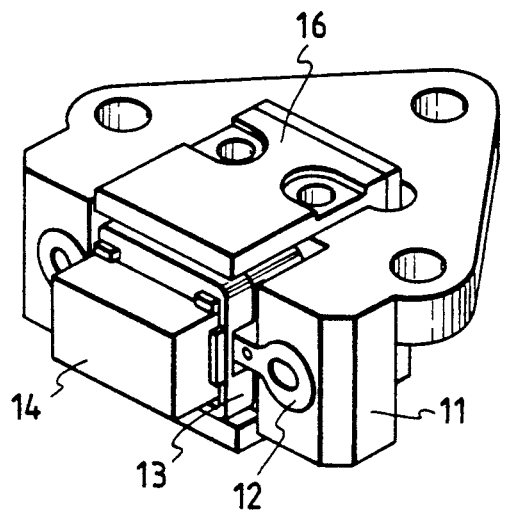
FIG. 4 is a perspective view of a pivotable mirror device for tracking according to the present invention.
Figure 5:
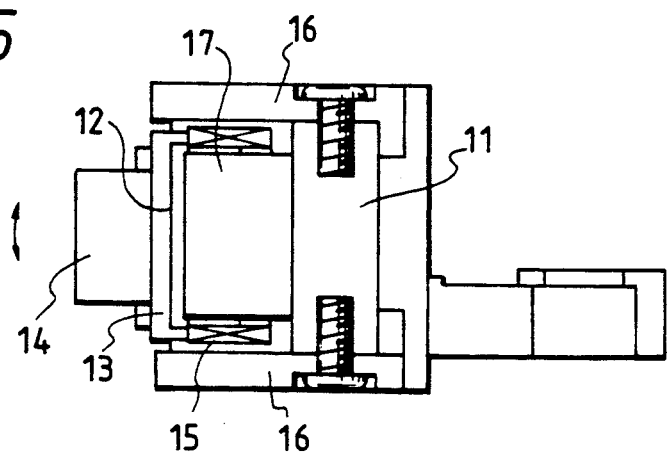
FIG. 5 is a cross-sectional view of the device of FIG. 4.

FIG. 4 is a perspective view of a pivotable mirror device for tracking, and FIG. 5 is a cross-sectional view of the same device. A mirror holding member 13 is supported on a support member 11 mounted on the base 200 shown in FIG. 1, through a thin leaf spring 12, and a reflecting mirror 14 is mounted on the mirror holding member 13. A coil 15 is annularly attached to the rear of the mirror holding member 13, a yoke 16 is installed outside the coil 15, and a permanent magnet 17 is disposed inside the coil 15 so that a magnetic field may be applied to the coil 15. The yoke 16 and the permanent magnet 17 are not in contact with the coil 15, but are fixed to the support member 11.

Figure 6:
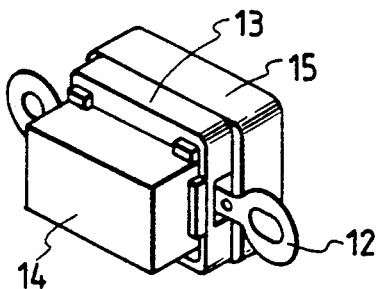
FIG. 6 is a perspective view of the movable portion of the device of FIG. 4.
Figure 7:
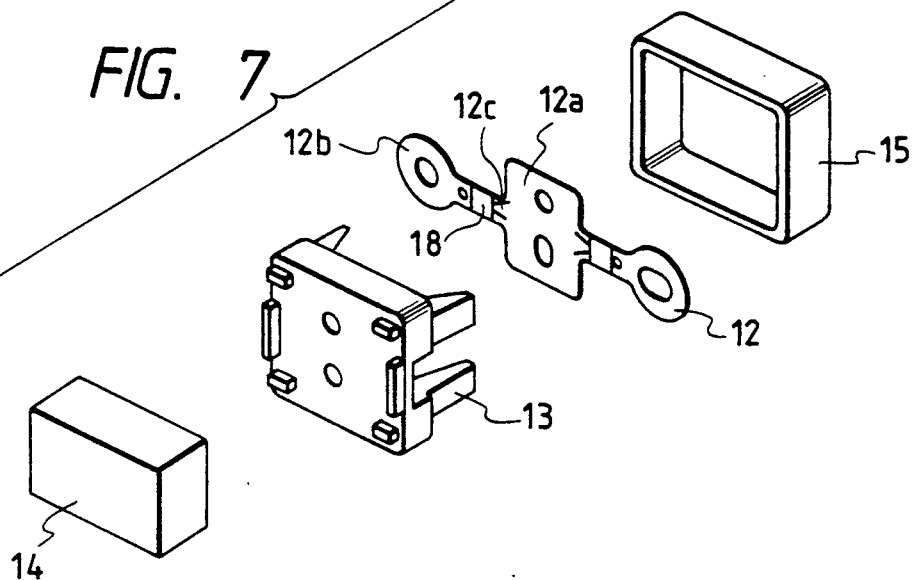
FIG. 7 is an exploded perspective view of the movable portion shown in FIG. 6.

FIG. 6 is a perspective view of a movable portion, and FIG. 7 is an exploded perspective view of the movable portion. The reflecting mirror 14 has its back fixed to the mirror holding member 13, which in turn has its back mounted on the central mounting portion 12a of the thin leaf spring 12, and the coil 15 is fixed from the rear thereof.

Figure 8:
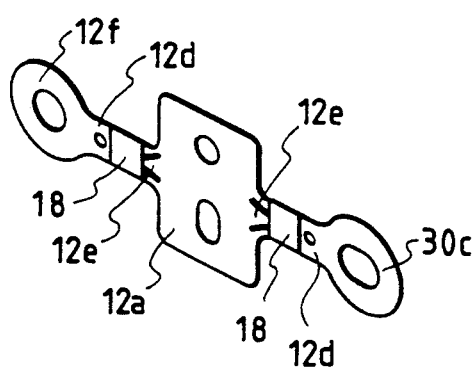
FIG. 8. is a perspective view of the thin leaf spring shown in FIGS. 4 to 7.
Figure 9:
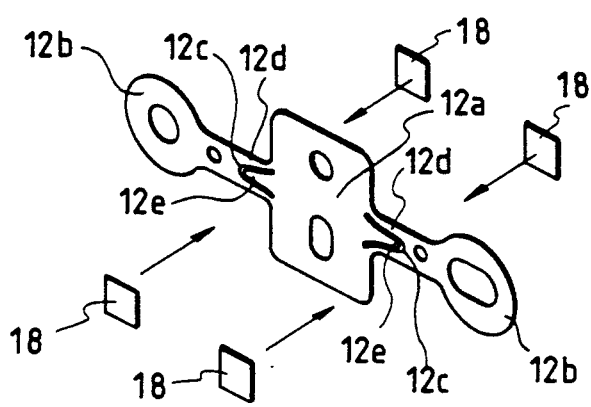
FIG. 9 is an exploded perspective view of the thin leaf spring shown in FIG. 8.

FIG. 8 is a perspective view of the thin leaf spring 12 and viscoelastic members 18, and FIG. 9 is an exploded perspective view thereof. The portions of the thin leaf spring 12 between the fixed portions 12b at the opposite ends thereof (the portions mounted on the support member 11) and the central mounting portion 12a are constricted to form torsional portions, and a substantially V-shaped through-aperture 12c which opens on the mounting portion 12a side is formed in each of the torsional portions. The outer side of each of these through-apertures 12c is made into a rotational supporting portion 12d which will be twisted when the reflecting mirror 14 pivots, and the inner side thereof is made into a pivotable portion 12e which will not be twisted, and the viscoelastic members 18 stick astride the pivotable supporting portion 12d and the pivotable portion 12e from the front and back thereof. The viscoelastic members 18 each are lined with a thin sheet material (a restraining sheet) such as aluminum foil and provide a high attenuation material against vibration. As for the specific material of which the viscoelastic members 18 are composed, mention may be made of butyl rubber or the like.

As a result of the electromagnetic force between the coil 15 and the magnetic field of the permanent magnet 17 by a current flowing to the coil 15, the reflecting mirror 14 is pivotally driven up and down. At this time, the pivotable portions 12e of the thin leaf spring 12 pivot with the mirror holding member 13 and the rotational supporting portions 12d are twisted, and in the viscoelastic members 18, a shearing force is created because twisting is restrained by the thin sheet material, and the viscoelastic members act as restrain type attenuation elements.

Figure 3:
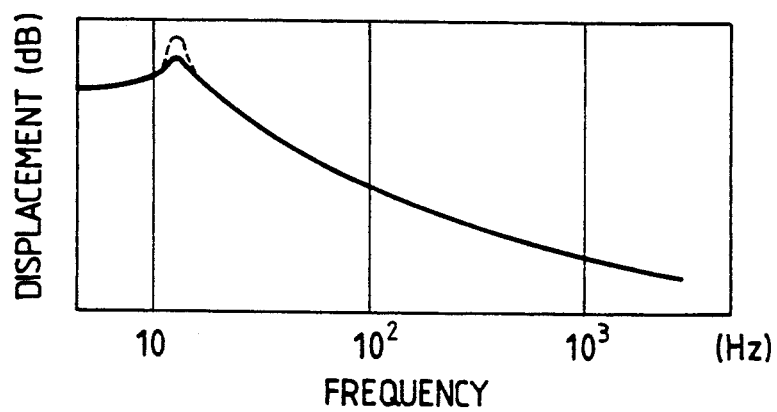
FIG. 3 is a graph illustrating the performance characteristic of the pivotable mirror device for tracking shown in FIG. 2.

In such a construction, not only as in the prior art, the thickness of the thin leaf spring 12 and the width of the torsional portions can be changed to thereby vary the resonance frequency, and stainless steel of small damping capacity, phosphor bronze, beryllium copper or the like can be used as the material of the thin leaf spring 12. That is the resonance amplitude can be made small as indicated by solid line in FIG. 3 because of the viscoelastic members 18 and the through-apertures 12c, and the control circuit becomes correspondingly simple.

While in the illustrated embodiment, the through-apertures 12c each open on the mounting portion 12a side, the through-apertures 12c each may be formed into a substantially V-shape which opens on the fixed portion 12b side, and the upper and lower portions thereof may be pivotable supporting portions which will be twisted and the intermediate portion thereof may be a non-pivotable portion which will not be twisted. Also, as a high attenuation element, a synthetic resin material such as silicone rubber, butyl rubber, neoprene rubber or vinyl chloride may be poured into or glazed onto the through-apertures 12c to form a non-restraining type attenuation element.

As described above, the pivotable mirror device for tracking according to the present invention reduces the amplitude of the main resonance frequency and is compact and easy to control, as well as permitting the vibration control system of an apparatus on which the present device is carried to be light in weight, because the reflecting mirror is supported by the use of the thin leaf spring and the high attenuation material.

What is claimed is:

1. A pivotable mirror device for tracking and for driving a light beam spot in the radial direction of an optical disk comprising an information recording medium, said device comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof;

a high attenuation member attached to said torsional portion; and wherein said torsional portion is divided into a portion which is twisted during said pivotal movement and a portion which is not twisted during said pivotal movement, and wherein said high attenuation member is provided so as to couple said divided portions together.

2. A pivotable mirror device for tracking and for driving a light beam spot in the radial direction of an optical disk comprising an information recording medium, said device comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof;

a high attenuation member attached to said torsional portion; and wherein said high attenuation member comprises a viscoelastic member and a restraining plate lined with said viscoelastic member.

3. A pivotable mirror device for tracking and for driving a light beam spot in the radial direction of an optical disk comprising an information recording medium, said device comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said torsional portion is provided with a portion having an opening to facilitate said pivotal movement, and wherein said high attenuation member is disposed on said portion having the opening.

4. An optical information recording-reproducing apparatus for effecting at least one of recording of information on and reproduction of information from a disklike optical information recording medium having a plurality of tracks by use of a light beam spot, said apparatus including:

a pivotable mirror device for moving the beam spot in a radial direction of the recording medium so as to effect a tracking operation of the beam spot to a given track;

said pivotable mirror device comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said high attenuation member comprises a viscoelastic member and a restraining plate lined with said viscoelastic member.

5. An optical information recording-reproducing apparatus for effecting at least one of recording of information on and reproduction of information from a disk-like optical information recording medium having a plurality of tracks by use of a light beam spot, said apparatus including:

a pivotable mirror device for moving the beam spot in a radial direction of the recording medium so as to effect a tracking operation of said beam spot to a given track;

said pivotable mirror device comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said torsional portion is provided with a portion having an opening to facilitate said pivotal movement, and wherein said high attenuation member is disposed on said portion having the opening.

6. A pivotable mirror device for deflecting a light beam toward a desired direction, comprising:

a mirror holding member for holding a reflecting mirror;

a thin leaf spring pivotably supporting said mirror holding member, wherein a planar portion of said thin leaf spring is laid on a rear surfacer of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said torsional portion is divided into a portion which is twisted during said pivotal movement and a portion which is not twisted during said pivotal movement, and wherein said high attenuation member is provided so as to couple said divided portions together.

7. A pivotable mirror device for deflecting a light beam toward a desired direction, comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said high attenuation member comprises a viscoelastic member and a restraining plate lined with said viscoelastic member.

8. A pivotable mirror device for deflecting a light beam toward a desired direction comprising:

a mirror holding member for holding a reflecting mirror;

a thin leaf spring pivotably supporting said mirror holding member, wherein a planar portion of said thin leaf spring is laid on a rear surface of the reflecting surface of the reflecting mirror, wherein said thin leaf spring is constricted between said planar portion and a portion at which said thin leaf spring is attached to a thin leaf spring supporting member to thereby form a torsional portion for pivotal movement thereof; and a high attenuation member attached to said torsional portion, wherein said torsional portion is provided with a portion having an opening to facilitate said pivotal movement, and wherein said high attenuation member is disposed on said portion having the opening.

* * * * *

UNITED STATES PATENT AND TRADEMARK OFFICE
CERTIFICATE OF CORRECTION

PATENT NO. : 5,268,784
DATED : December 7, 1993
INVENTOR(S) : MASAHIKO CHAYA

It is certified that error appears in the above-indentified patent and that said Letters Patent is hereby corrected as shown below:

COLUMN 1
    Line 5, "No. 07/828,147, filed Jan. 20, 1992," should read
       --No. 07/828,147, filed Jan. 30, 1992,--.

COLUMN 6
    Line 1, "surfacer" should read --surface--.

Signed and Sealed this

Second Day of August, 1994

Attest:

BRUCE LEHMAN

Attesting Officer     Commissioner of Patents and Trademarks